United States Patent
Liu et al.

(10) Patent No.: US 7,681,323 B2
(45) Date of Patent: Mar. 23, 2010

(54) BASE AND CONTOUR MEASURING SYSTEM USING THE SAME

(75) Inventors: Qing Liu, Shenzhen (CN); Jun-Qi Li, Shenzhen (CN)

(73) Assignees: Hong Fu Jin Precision Industry (ShenZhen) Co., Ltd., Shenzhen, Guangdong Province (CN); Hon Hai Precision Industry Co., Ltd., Tu-Cheng, Taipei Hsien (TW)

( * ) Notice: Subject to any disclaimer, the term of this patent is extended or adjusted under 35 U.S.C. 154(b) by 236 days.

(21) Appl. No.: 11/966,959

(22) Filed: Dec. 28, 2007

(65) Prior Publication Data

US 2009/0025242 A1    Jan. 29, 2009

(30) Foreign Application Priority Data

Jul. 26, 2007    (CN) .................. 2007 1 0201173

(51) Int. Cl.
*G01B 5/008* (2006.01)

(52) U.S. Cl. ............................ 33/503; 33/556; 33/559; 33/572; 73/1.79

(58) Field of Classification Search ............... 73/1.79, 73/1.81; 33/502, 556, 559, 572, 503
See application file for complete search history.

(56) References Cited

U.S. PATENT DOCUMENTS

| | | | | |
|---|---|---|---|---|
| 4,142,295 | A | * | 3/1979 | Nishina et al. ................. 33/559 |
| 5,111,592 | A | * | 5/1992 | Aehnelt et al. ................. 33/561 |
| 5,174,039 | A | * | 12/1992 | Murai .......................... 33/556 |

* cited by examiner

*Primary Examiner*—Randy W Gibson
(74) *Attorney, Agent, or Firm*—Frank R. Niranjan

(57) ABSTRACT

An exemplary base includes a first elastic element, a second elastic, two first adjustable spacers and two second adjustable spacers. The first elastic element includes two first spaced plates and a first connecting element for connecting the two first spaced plates. The second elastic element includes two second spaced plates and a second connecting element for connecting the two second spaced plates. The first connecting element and the second connecting element are not in a plane. Two first adjustable spacers connect the two first spaced plates and adjust a distance between the two first spaced plates. Two second adjustable spacers connect the two second spaced plates and adjust a distance between the two second spaced plates.

9 Claims, 7 Drawing Sheets

BASE AND CONTOUR MEASURING SYSTEM USING THE SAME

CROSS-REFERENCE TO RELATED APPLICATIONS

This application is related to nine co-pending U.S. patent applications, which are: application Ser. No. 11/611,724, filed on Dec. 15, 2006, and entitled "DISTANCE MEASURING PROBE WITH AIR DISCHARGE SYSTEM", application Ser. No. 11/843,664, filed on Aug. 23, 2007, and entitled "CONTOUR MEASURING DEVICE WITH ERROR CORRECTING UNIT", application Ser. Nos. 11/966,951and 11/966,952, and both entitled "CONTOUR MEASURING PROBE", application Ser. Nos. 11/966,957 and 11/966,956, and entitled "CONTOUR MEASURING METHOD FOR MEASURING ASPECTS OF OBJECTS", application Ser. No. 11/966,961, and entitled "MEASURING DEVICE AND METHOD FOR USING THE SAME", application Ser. No. 11/966,964, and entitled "MEASURING DEVICE FOR MEASURING ASPECTS OF OBJECTS", and applications Ser. No. 11/966,954, and entitled "CONTOUR MEASURING PROBE FOR MEASURING ASPECTS OF OBJECTS". In Ser. Nos. 11/611,724, 11/843,664, 11/966,951, 11/966,957, and 11/966,956,the inventors are Qing Liu, Jun-Qi Li, and Takeo Nakagawa. In Ser. Nos. 11/966,961, 11/966,964, and 11/966,952 the inventors are Qing Liu and Jun-Qi Li. In Ser. No. 11/966,954, the inventors are ,Jian-bin Kong and Qing Liu. In Ser. Nos. 11/611,724 and 11/843,664, the assignee is Hon HAI PRECISION INDUSTRY CO. LTD and FINE TECH Corporation, and the assignee of other applications is HONG FU JIN PRECISION INDUSTRY (ShenZhen) CO., LTD and Hon HAI PRECISION INDUSTRY CO. LTD.

BACKGROUND OF THE INVENTION

1. Field of the Invention

The present invention relates to bases and contour measuring systems using the same, and particularly to, a base and a contour measuring system using the same with a high measuring precision.

2. Discussion of the Related Art

A contour measuring probe is used for measuring a figure of a precision element, such as an optical element. However, when measuring, the contour measuring probe must be kept in touch with the precision element when the contour measuring probe moves relative to a moving precision element. Generally, the contour measuring probe is fixed to a base, and follows a movement of the base.

Referring to FIG. 7, a base 10 includes a non-slidable platform 11, a saddle member 12, and a slidable platform 13. A pair of first guide rails 111 are fixed on the non-slidable platform 11 extending in a direction parallel to a Y-axis. The saddle member 12 is disposed on the first guide rails 111 and moves along the first guide rails 111. A pair of second guide rails 121 are fixed on the saddle member 12 extending in a direction parallel to an X-axis. The slidable platform 13 is disposed on the second guide rails 121 and moves along the second guide rails 121. A contour measuring probe 20 is fixed on the slidable platform 13. A tip extension 201 of the contour measuring probe 20 moves in a direction parallel to a Z-axis. The contour measuring probe 20 can move along the X-axis via a movement of the slidable platform 13, and can move along the Y-axis via a movement of the saddle member 12. In a measuring process, the contour measuring probe 20 moves along the X-axis or the Y-axis while the tip extension 201 of the contour measuring probe 20 moves along the Z-axis driven by a small measuring force to remain in touch with an optical element 30.

However, the tip extension 201 of the contour measuring probe 20 cannot extend along the Z-axis after fixed on the slidable platform 13, because a surface of the slidable platform 13 is generally not smooth and a limitation of a machining precise of the guide rails 111, 121. Since the tip extension 201 of the contour measuring probe 20 is slanted relative to the Z-axis, the displacement information of the tip extension 201 cannot reflect a change of a height along the Z-axis of the optical element 30, thereby a measuring precision of the contour measuring probe 20 decreases.

Therefore, a new base and a contour measuring system using the same which can overcome the above-described problem are desired.

SUMMARY

A base includes a first elastic element, a second elastic, two first adjustable spacers and two second adjustable spacers. The first elastic element includes two first spaced plates and a first connecting element for connecting the two first spaced plates. The two first spaced plates and the first connecting element cooperatively define a first spacing. The second elastic element includes two second spaced plates and a second connecting element for connecting the two second spaced plates. The two second spaced plates and the second connecting element cooperatively define a second spacing. An angle formed by the first connecting element and the second connecting element is between 0 degree and 180 degree. Two first adjustable spacers connect the two first spaced plates and adjust a distance between the two first spaced plates. Two second adjustable spacers connect the two second spaced plates and adjust a distance between the two second spaced plates.

Another base includes a first U-shaped element, a second U-shaped element, two first adjustable spacers and two second adjustable spacers. A first U-shaped element includes two first leg portions. The second U-shaped element includes two second leg portions. The second U-shaped element is stacked on the first U-shaped element. One of the first leg portions is in contact with one of the second leg portions. The first U-shaped element and the second U-shaped element face different directions. Two first adjustable spacers connect the two first leg portions for adjusting a distance between the first leg portions of the first U-shaped element. Two second adjustable spacers connect the two second leg portions for adjusting a distance between the second leg portions of the second U-shaped element.

A contour measuring system includes a base and a contour measuring probe disposed on the base. The base is one of the bases as described in the previous two paragraphs. The contour measuring probe has a tip extension for touching a surface of an object.

Other advantages and novel features will become more apparent from the following detailed description when taken in conjunction with the accompanying drawings.

BRIEF DESCRIPTION OF THE DRAWINGS

The components in the drawings are not necessarily drawn to scale, the emphasis instead being placed upon clearly illustrating the principles of the present contour measuring systems. Moreover, in the drawings, like reference numerals designate corresponding parts throughout the several views, and all the views are schematic.

DETAILED DESCRIPTION OF THE EMBODIMENTS

Reference will now be made to the drawings to describe preferred embodiments of the present bases and contour measuring systems using the same with a high measuring precision, in detail.

Figure 1:
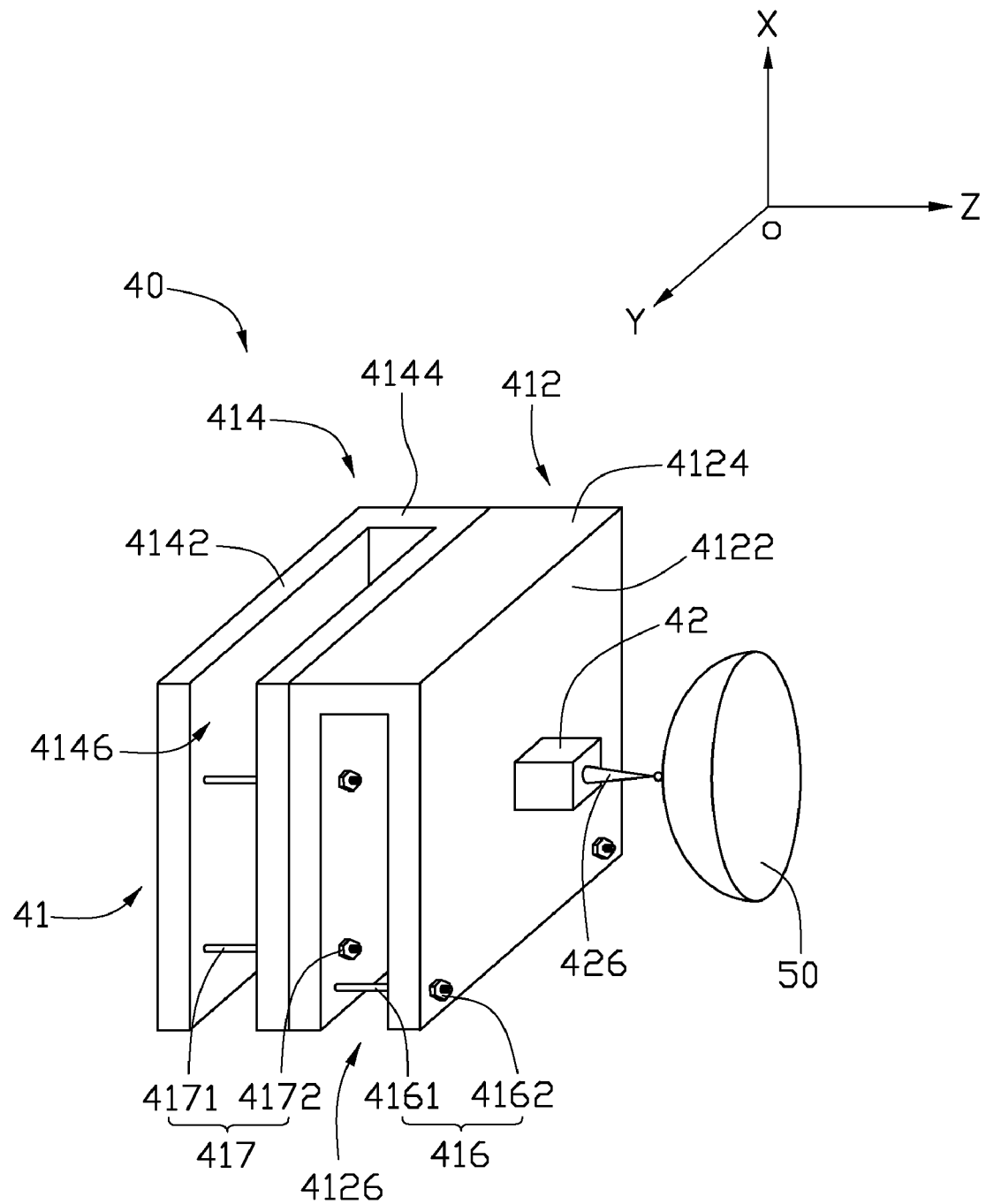
FIG. 1 is an isometric view of a contour measuring system in accordance with a first preferred embodiment of the present invention, the contour measuring system including a contour measuring probe.

Referring to FIG. 1, a contour measuring system 40 in accordance with a first preferred embodiment of the present invention is shown. The contour measuring system 40 includes a base 41 and a contour measuring probe 42 fixed on the base 41.

The base 41 includes a first U-shaped element 412, a second U-shaped element 414, a plurality of first adjustable spacers 416, and a plurality of second adjustable spacers 417. The first U-shaped element 412 includes a pair of spaced plates 4122, and a connecting plate 4124 connecting corresponding ends of the two spaced plates 4122. The two spaced plates 4122 and a connecting plate 4124 cooperatively define a first spacing 4126. The connecting plate 4124 is a flat plate. The second U-shaped element 414 has a same structure as the first U-shaped element 412. The second U-shaped element 414 and the first U-shaped element 412 are stacked against each other such that the connecting plate 4124 and the connecting plate 4144 are rotated ninety degrees relative each other. In this embodiment, the base 41 includes two first adjustable spacers 416 and two second adjustable spacers 417. The first adjustable spacer 416 includes a bolt 4161 and a nut 4162 attached to the bolt 4161. The second adjustable spacer 417 includes a bolt 4171 and a nut 4172 fixed to the bolt 4171. The two bolts 4161 run through the two spaced plates 4122 of the first U-shaped element 412 and one spaced plate 4142 of the second U-shaped element 414 adjacent the first U-shaped element 412 correspondingly. The nuts 4162 are attached to the end of the bolts 4161 correspondingly. A distance corresponding sections between the two spaced plates 4122 can be adjusted by twisting (tightening or loosening) the nuts 4162. The other two bolts 4171 run through the two spaced plates 4142 of the second U-shaped element 414 and one spaced plate 4122 of the first U-shaped element 412 adjacent the second U-shaped element 414 correspondingly. The nuts 4172 are attached to the end of the bolts 4171. A distance at corresponding sections between the two spaced plates 4142 can be adjusted by twisting (tightening or loosening) the nuts 4172.

It is to be understood that, in order to improve a bonding strength between of the first U-shaped element 412 and the second U-shaped element 412, the first U-shaped element 412 and the second U-shaped element 412 can be welded or glued together.

Figure 2:
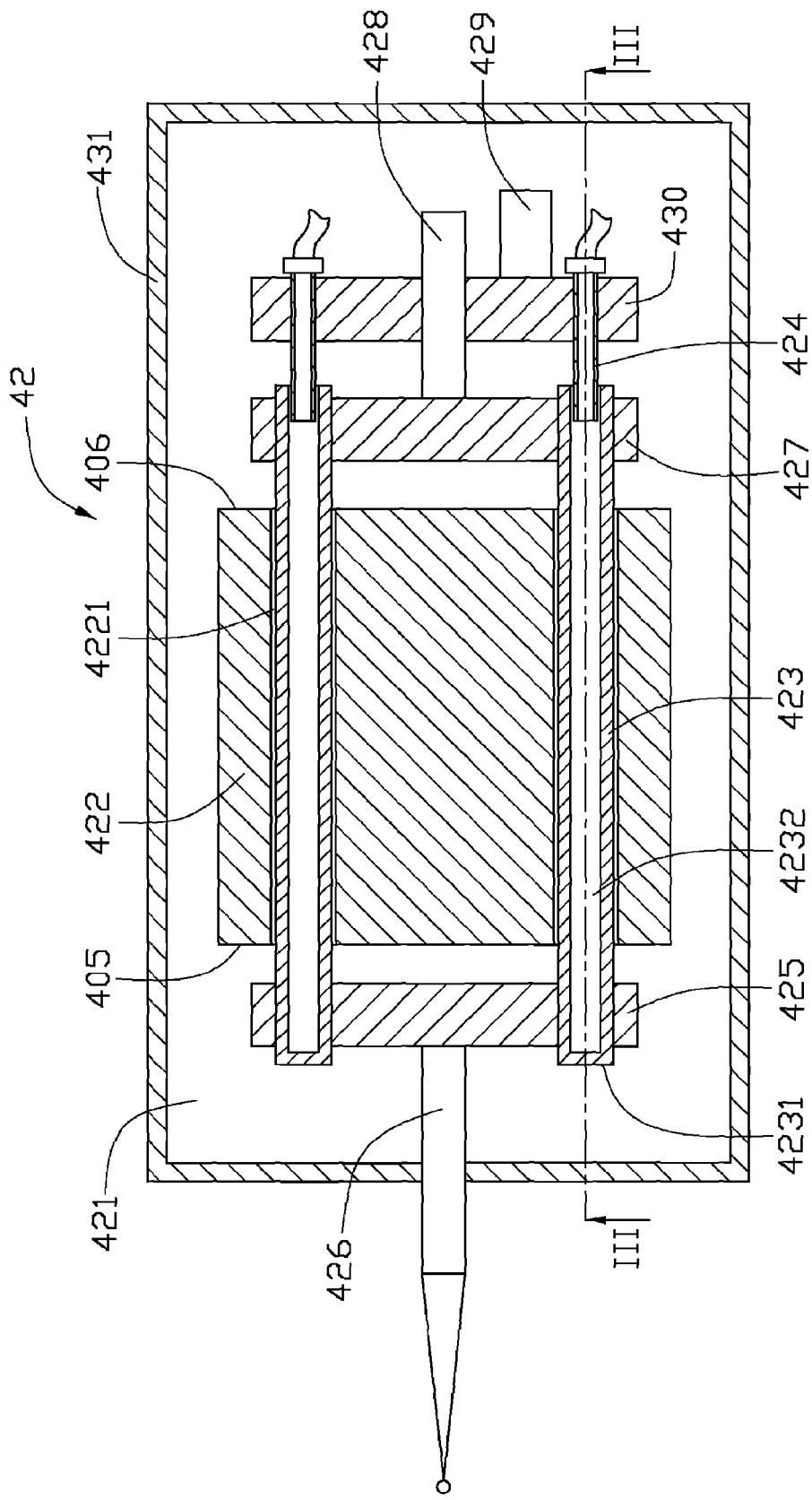
FIG. 2 is a side cross-sectional view of the contour measuring probe of FIG. 1.
Figure 3:
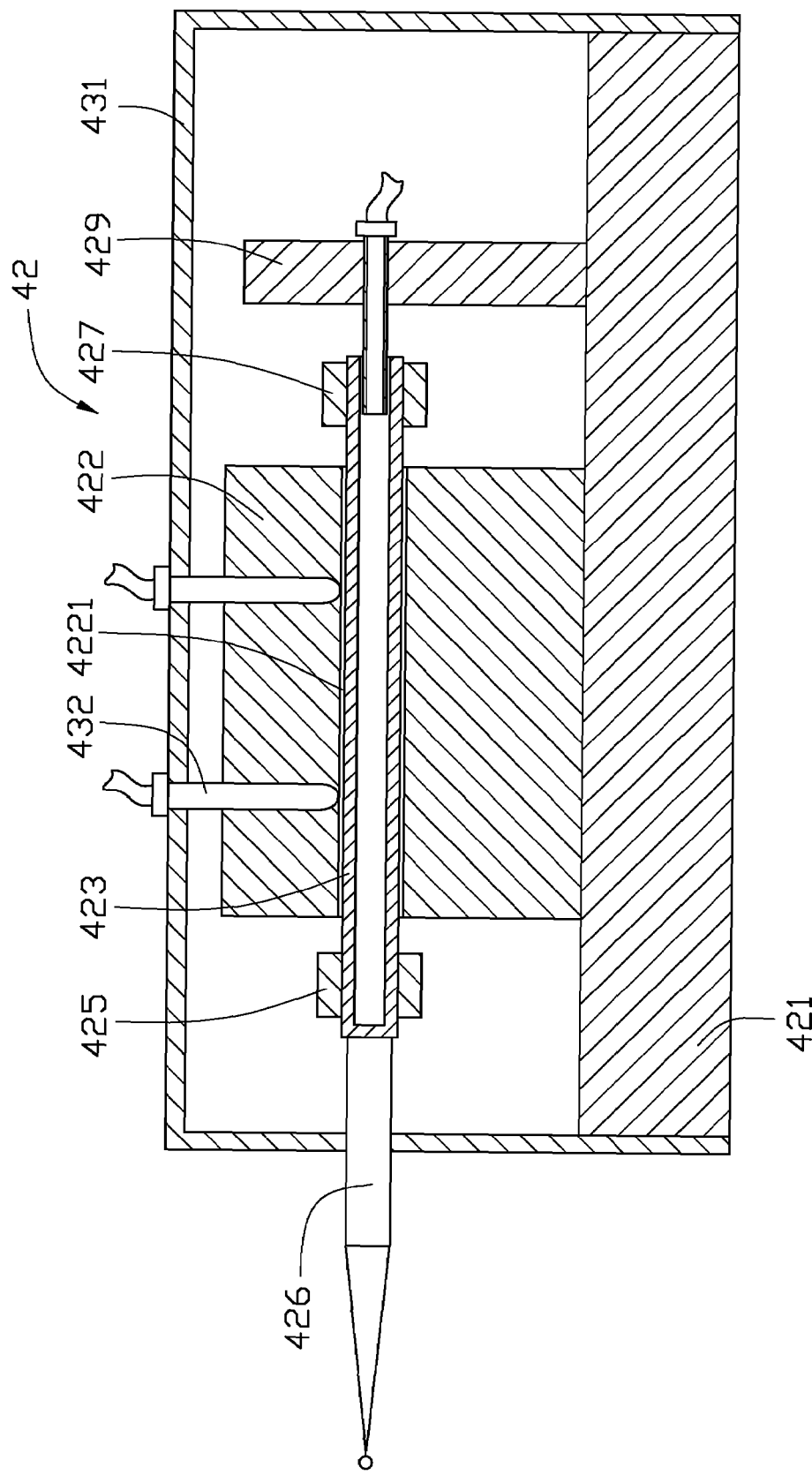
FIG. 3 is another side cross-sectional view of the contour measuring probe of FIG. 2, taken along line III-III thereof.

Referring to FIGS. 2 and 3, the contour measuring probe 42 includes a base plate 421, a tube track 422, two hollow tubes 423, two pipes 424, a first tube frame 425, a tip extension 426, a second tube frame 427, a linear measuring scale 428, a displacement sensor 429, and a pipe holder 430. The hollow tubes 423 and the first and second frames 425, 427 collectively form a movable rack (not labeled). In other embodiments, the contour measuring probe 42 can include only one hollow tube 423 or more than two hollow tubes 423. Correspondingly, at least one pipe 424 is employed to match with the at least one hollow tube 423.

The base plate 421 is substantially a flat rectangular plate. It should be understood that the base plate 421 might alternatively have any other suitable shapes. The tube track 422 is mounted securely onto the base plate 421. The tube track 422 has a front end 405 and a rear end 406. The tube track 422 defines two tube rail channels 4221 each extending from the front end 405 to the rear end 406. The tube rail channels 4221 are spaced apart from and aligned parallel to each other. In alternative embodiments, the tube track 422 may define only one tube rail channel 4221 or more than two tube rail channels 4221, corresponding to the number of hollow tubes 423.

Each of the hollow tubes 423 is a cylinder defining a cavity 4232 that extends through the hollow tube 423 from a rear open end of the hollow tube 423 to a front cylinder base 4231 of the hollow tube 423. The hollow tubes 423 are received through the corresponding tube rail channels 4221 of the tube track 422 correspondingly. The rear open ends of the hollow tubes 423 protrude out from the rear end 406 and are fixed onto the second tube frame 427. The front cylinder base 4231 of the hollow tubes 423 protrudes out from the front end 405 and is fixed onto the first tube frame 425. In an alternative embodiment, a plurality of air eject holes (not shown) can be defined in the front cylinder base 4231 and a sidewall of each hollow tube 423. An outer diameter of the hollow tubes 423 is configured to be smaller than a diameter of the tube rail channels 4221 so that a gap (not labeled) is defined between the hollow tube 423 and the tube tracks 422 correspondingly. Air is pumped into the gap between the hollow tubes 423 and the tube track 422. Thus, an air bearing is formed between each of the hollow tubes 423 and the tube track 422 when the gaps are filled with air.

Each of the pipes 424 is partially inserted into the open end of a corresponding hollow tube 423. An outer diameter of the pipes 424 is smaller than a diameter of the cavities 4232 of the hollow tubes 423, so that a gap is defined between each pipe 424 and the corresponding hollow tube 423. An air bearing (not labeled) is formed between each pipe 424 and the corresponding hollow tube 423 when air is pumped into the cavities 4232 of the hollow tubes 423 via the pipes 424. Therefore, frictional forces between the hollow tubes 423 and the tube track 422, and between the pipes 424 and the hollow tubes 423, are significantly small. The result is that the hollow tubes 423 can move in the tube rail channels 4221 smoothly.

The pipe holder 430 is fixed on the base plate 421 behind the second tube frame 427. The pipe holder 430 is configured to hold the pipes 424 in position. When air is pumped into the cavities 4232 of the hollow tubes 423, an air current inside the cavities 4232 creates a pushing force that pushes the hollow tube 423 away from the pipes 424, thereby driving the tip extension 426 away from the second tube frame 427.

The tip extension 426 is needle-shaped, and has a tip extension 426 that gently touches an object when the contour measuring probe 42 is used for measuring the contour of the object. The tip extension 426 is fixed on the first tube frame 425 so that the tip extension 426 is linearly movable together with the movable rack. The linear measuring scale 428 is fixed on the second tube frame 427 such that it moves linearly when the movable rack moves. The displacement sensor 429 is mounted on the base plate 421 corresponding to the linear measuring scale 428. The displacement sensor 429 is used for reading displacement information from the linear measuring scale 428 and digitally sends displacement values to the controller. Since both the tip extension 426 and the displacement sensor 429 are linearly connected to the movable rack correspondingly, the displacement values of the tip extension 426 reflects (is equal to) the displacement values of the linear measuring scale 428. Alternatively, the positions of the linear measuring scale 428 and the displacement sensor 429 may be exchanged.

Referring to FIG. 3, the contour measuring probe 42 further includes a cover 431 that engages on the base plate 421 and completely seals the various other components of the contour measuring probe 42. The cover 431 defines an opening (not labeled) for allowing a part of the tip extension 426 to extend out the cover 431. Air is pumped into the gaps between the tube track 422 and the hollow tubes 423 to form the air bearing via a plurality of tubes 432 mounted to the cover 431.

Figure 4:
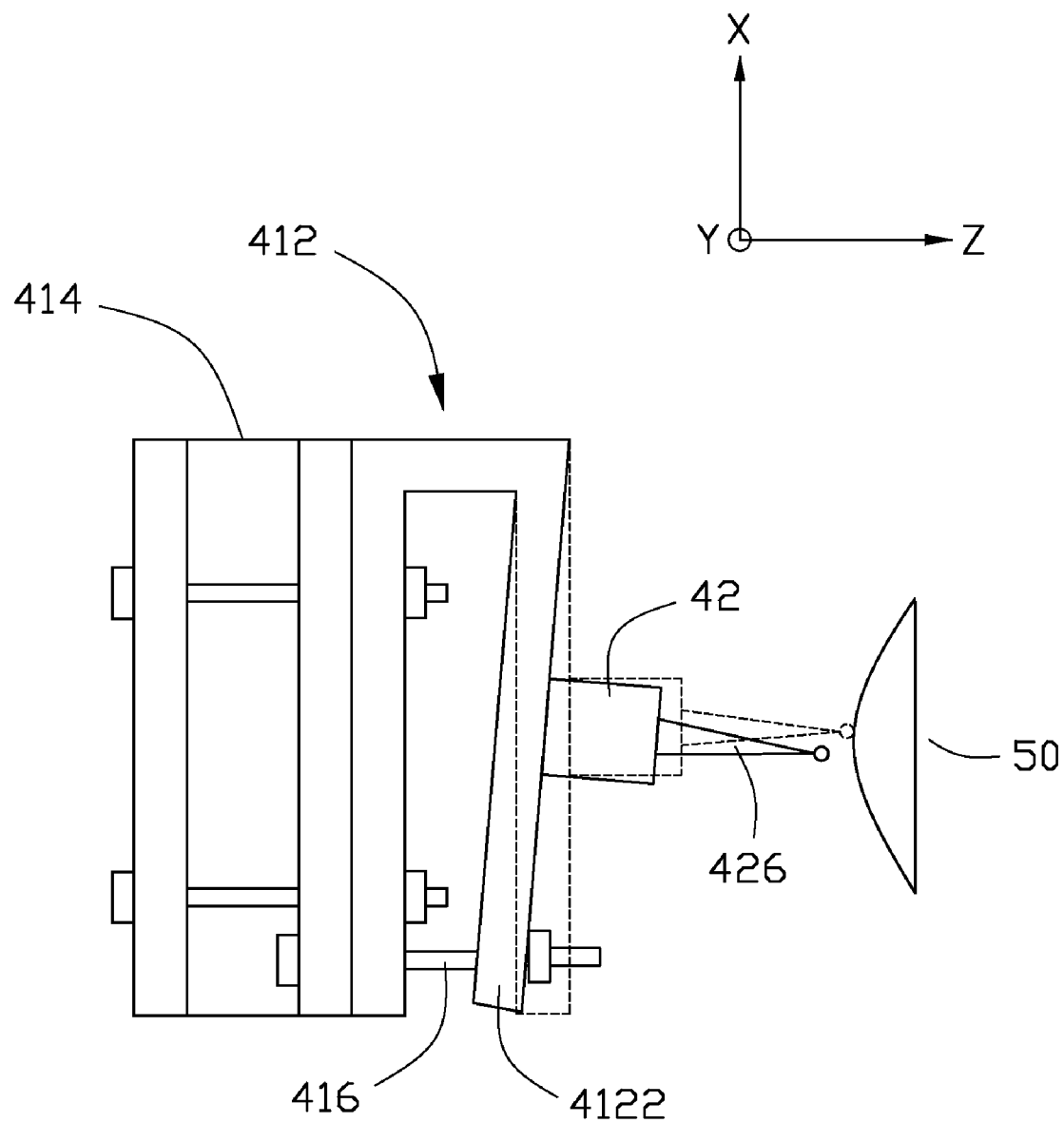
FIG. 4 is a side view of the contour measuring system of FIG. 1 moving in the XZ plane.
Figure 5:
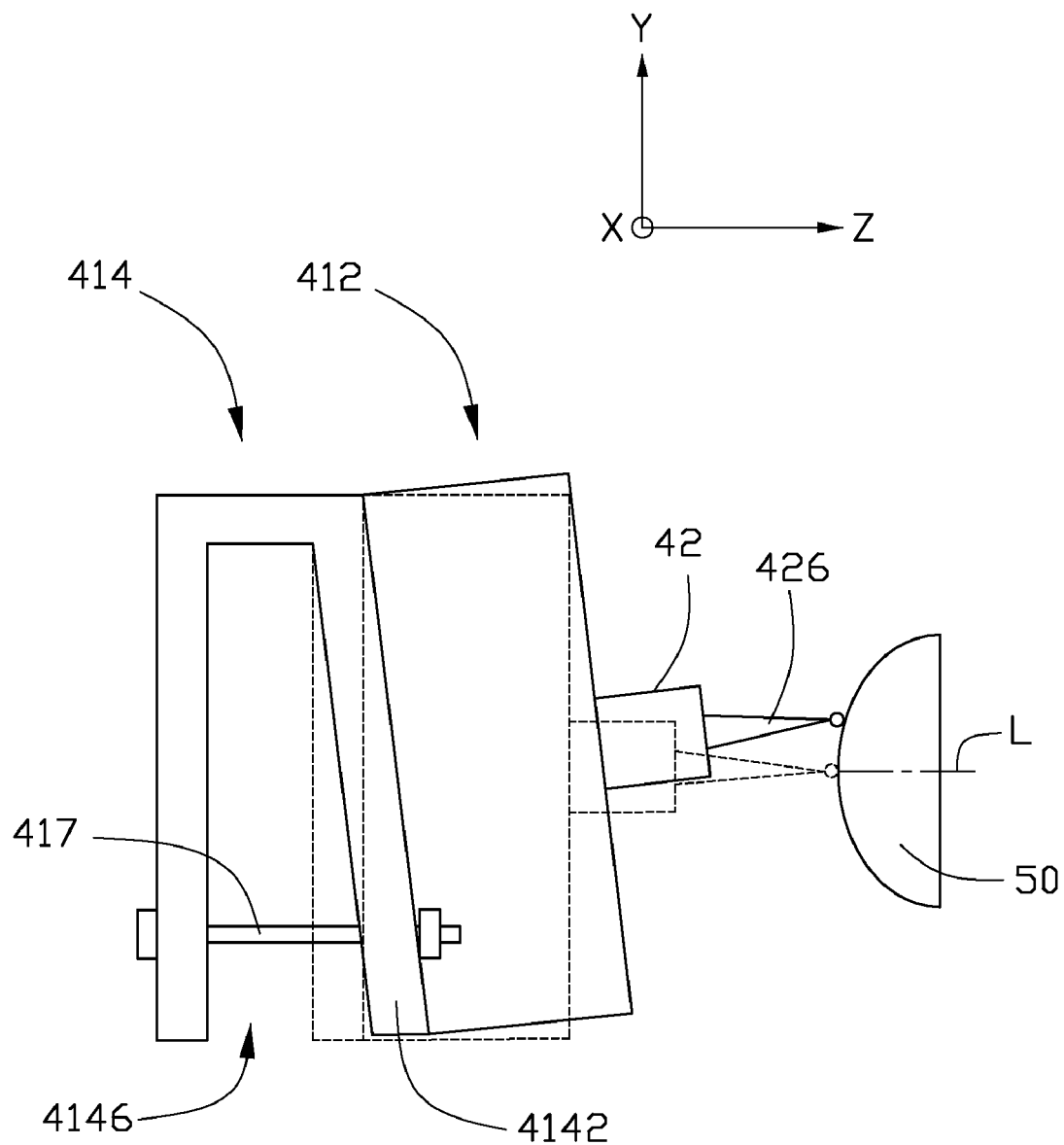
FIG. 5 is a side view of the contour measuring system of FIG. 1 moving in the YZ plane.

Referring to FIGS. 1, 4 and 5, in a measuring process, the contour measuring probe 42 is positioned on a slidable platform (not shown) movable along the X-axis or the Y-axis. A distance between two opposite spaced plates 4122 of the first U-shaped element 412 is changed by adjusting the first adjustable spacers 416, that is, a width at certain sections of the first spacing 4126 is changed. Therefore, the contour measuring probe 42 can be rotated/tilted relative to the Y-axis until the tip extension 426 of the contour measuring probe 42 reaches a position such that an extending direction of the tip extension 426 is parallel to the Y-Z plane. A distance between two opposite spaced plates 4142 of the second U-shaped element 414 is changed by adjusting the second adjustable spacers 417, that is, a width at certain sections of the second spacing 4146 is changed. Thereby, the contour measuring probe 42 can be rotated/tilted in a plane parallel to Y-Z plane until the tip extension 426 of the contour measuring probe 42 reaches a predetermined measuring position. When the contour measuring probe 42 reaches the predetermined measuring position, the extending direction of the tip extension 426 is aligned with a central axes L of the optical element 50. Finally, in order to get the measuring information of a figure of the optical element 50, the contour measuring probe 42 moves along the X-axis or the Y-axis via a movement of the slidable platform carrying the contour measuring probe 42, when the tip extension 426 movable along the Z-axis.

Because the first U-shaped element 412 stacks on the second U-shaped element 414, and the angle formed by the connecting plate 4124 and the connecting plate 4144 is 90 degrees, change of the distance between two opposite spaced plates 4122 of the first U-shaped element 412 rotates the contour measuring probe 42 rotate relative to the Y-axis, similarly, the change of the distance between two opposite spaced plates 4142 of the second U-shaped element 414 can make the contour measuring probe 42 rotate relative to the X-axis. Therefore, the tip extension 426 of the contour measuring probe 42 can be adjusted to the predetermined measuring position, and a measuring precision of the contour measuring probe 42 increases.

It should be noted that, an angle formed by the connecting plate 4124 and the connecting plate 4144 can also be an acute angle. The connecting plate 4124, 4144 can also be a curved plate. Furthermore, the U-shaped element 412, 414 can also be replaced by other elastic elements, such as an elastic element formed by using a U-shaped spring to connect two flat plates. In addition, the base 41 can carry other measuring device except for the contour measuring probe 42, and adjust the measuring device to a measuring position.

Figure 6:
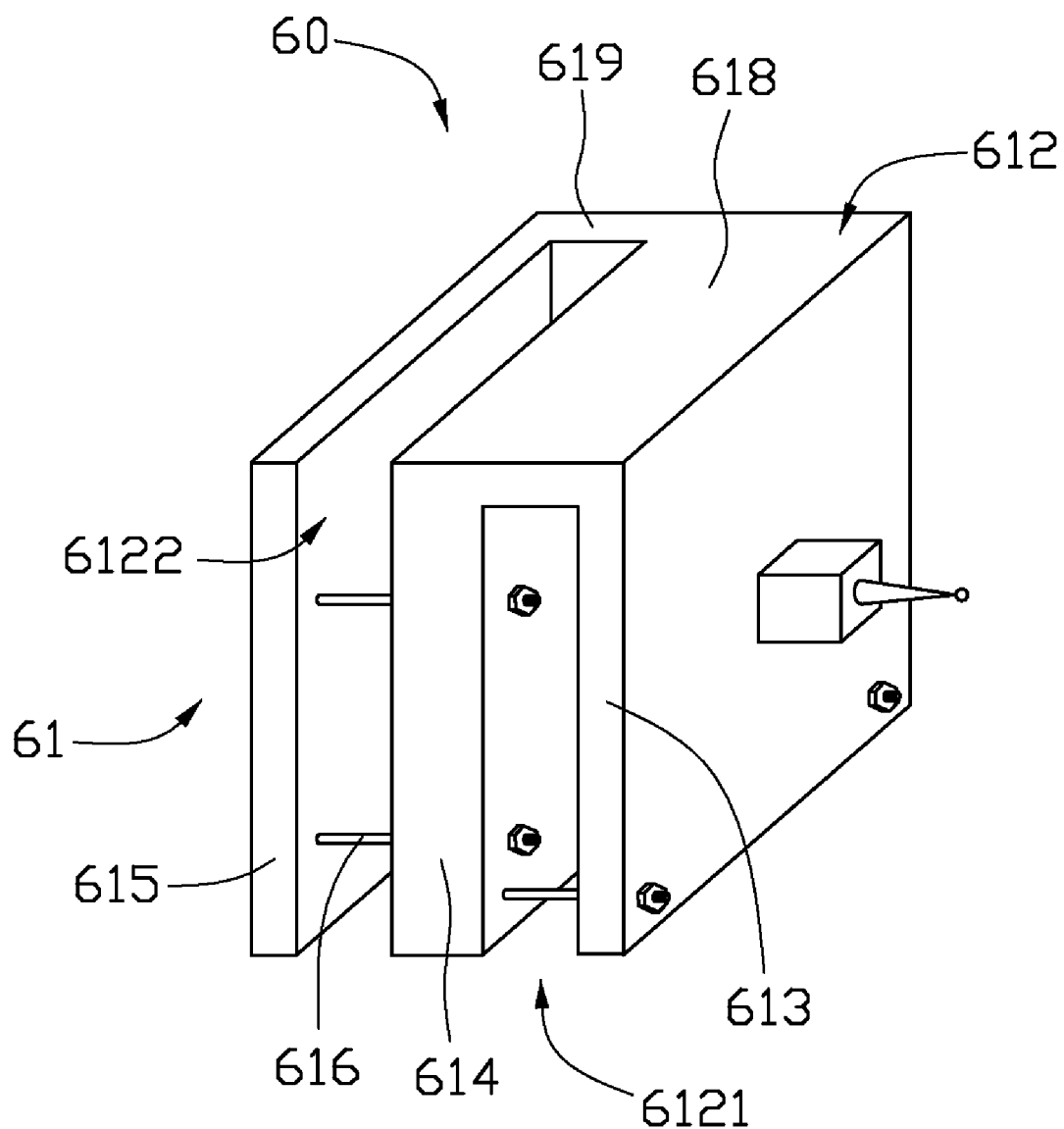
FIG. 6 is an isometric view of a contour measuring system in accordance with a second preferred embodiment of the present invention
Figure 7:
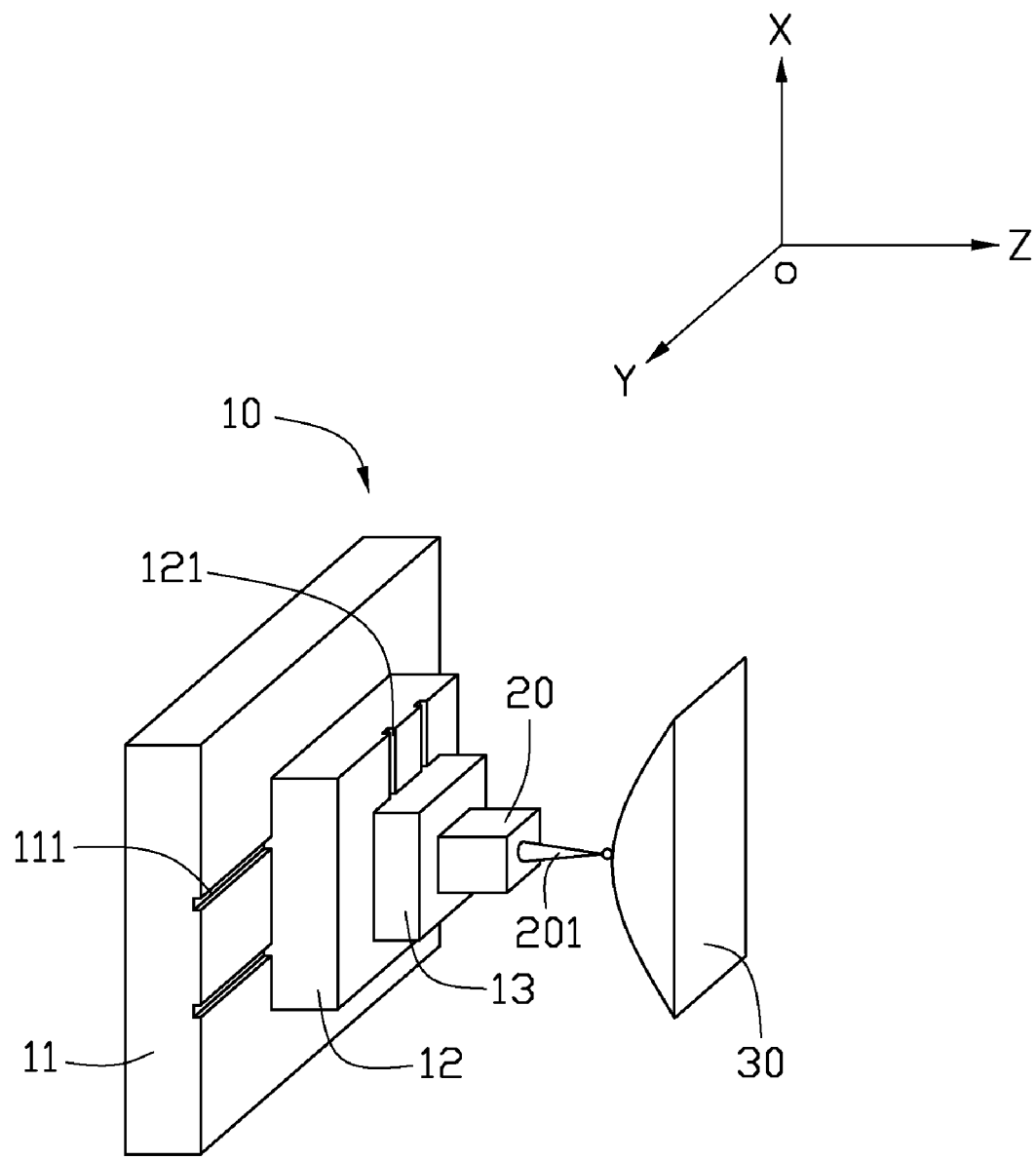
FIG. 7 is an isometric view of a conventional contour measuring system.

Referring to FIG. 6, a contour measuring system 60 in accordance with a second preferred embodiment of the present invention is shown. The contour measuring system 60 is similar in principle to the contour measuring system 40 of the first preferred embodiment, however the base 61 just includes an elastic element 612. The elastic element 612 including a first spaced plate 613, a second spaced plate 614, a third spaced plate 615, a first connecting plate 618 and a second connecting plate 619. The first connecting plate 618 connecting ends of the first spaced plate 613 and the second spaced plate 614 at a same side. The first spaced plate 613, the second spaced plate 614 and the first connecting plate 618 cooperatively define a first spacing 6121. The second connecting plate 619 connecting ends of the second spaced plate 614 and the third spaced plate 615 at a same side. The second spaced plate 614, the third spaced plate 615 and the second connecting plate 619 cooperatively define a second spacing 6122. An angle formed by the first connecting plate 618 and the second connecting plate 619 is 90 degrees. In order to adjust a distance between the first spaced plate 613 and the second spaced plate 614, two of the four adjustable spacers 616 are used for connecting the first spaced plate 613 and the second spaced plate 614. In order to adjust a distance between the second spaced plate 614 and the third spaced plate 615, two of the four adjustable spacers 616 are used for connecting the second spaced plate 614 and the third spaced plate 615. The contour measuring system 60 can get a same measuring precision as the contour measuring system 40.

It is believed that the present embodiments and their advantages will be understood from the foregoing description, and it will be apparent that various changes may be made thereto without departing from the spirit and scope of the invention or sacrificing all of its material advantages, the examples hereinbefore described merely being preferred or exemplary embodiments of the invention.

What is claimed is:

1. A contour measuring system comprising:
 a base having:
  a first elastic element including two first spaced plates and a first connecting element connecting ends of the two first spaced plates at a same side, the two first spaced plates and the first connecting element cooperatively defining a first spacing;
  a second elastic element stacked on the first elastic element, the second elastic element including two second spaced plates and a second connecting element connecting ends of the two second spaced plates at a same side, the two second spaced plates and the second connecting element cooperatively defining a second spacing, wherein the first connecting element and the second connecting element are not in a same plane;
  at least one first adjustable spacer connecting the two first spaced plates of the first elastic element for adjusting a distance between the two first spaced plates; and
  at least one second adjustable spacer connecting the two second spaced plates of the second elastic element for adjusting a distance between the two second spaced plates; and a contour measuring probe disposed on the base, the contour measuring probe having a tip extension for touching a surface of an object.

2. The contour measuring system as claimed in claim 1, wherein the contour measuring probe further comprises at least one hollow tube, the tip extension being driven by the at least one hollow tube.

3. The contour measuring system as claimed in claim 2, wherein the at least one hollow tube comprises an air discharge system configured to eject at least part of the flux of air in the at least one hollow tube out of the at least one hollow tube.

4. The contour measuring system as claimed in claim 3, wherein the air discharge system is a combination consisting of any of at least one air eject hole defined in the cylinder base of the at least one hollow tube, and at least one air eject hole defined in a sidewall of the at least one hollow tube.

5. The contour measuring system as claimed in claim 1, wherein the contour measuring probe further comprises a linear measuring scale and a displacement sensor, one of the linear measuring scale and the displacement sensor moves following the tip extension.

6. A contour measuring system comprising:
   a base having:
      a first U-shaped element comprising two first leg portions;
      a second U-shaped element comprising two second leg portions, the second U-shaped element stacked on the first U-shaped element, wherein one of the first leg portions is in contact with one of the second leg portions, and the first U-shaped element and the second U-shaped element face different directions;
      at least one first adjustable spacer connecting the two first leg portions for adjusting a distance between the two first leg portions of the first U-shaped element;
      at least one second adjustable spacer connecting the two second leg portions for adjusting a distance between the two second leg portions of the second U-shaped element; and
   a contour measuring probe disposed on the base, the contour measuring probe having a tip extension for touching a surface of an object.

7. The contour measuring system as claimed in claim 6, wherein the first adjustable spacer comprises a bolt and a nut fixed to the bolt, and the second adjustable spacer comprises a bolt and a nut fixed to the bolt.

8. The contour measuring system as claimed in claim 6, wherein the first U-shaped element and the second U-shaped element face perpendicular directions.

9. The contour measuring system as claimed in claim 6, wherein the first U-shaped element and the second U-shaped element are welded or glued together.

* * * * *